United States Patent [19]

Taniguchi et al.

[11] Patent Number: 4,544,966
[45] Date of Patent: Oct. 1, 1985

[54] TRACKING CONTROL SYSTEM USING INTERMITTENTLY RECORDED PILOT SIGNALS

[75] Inventors: Hiroshi Taniguchi, Hirakata; Masamitsu Ohtsu, Kadoma; Kanji Kubo, Katano, all of Japan

[73] Assignee: Matsushita Electric Industrial Co., Ltd., Osaka, Japan

[21] Appl. No.: 301,097

[22] Filed: Sep. 10, 1981

[30] Foreign Application Priority Data

Sep. 17, 1980 [JP] Japan ................ 55-129727

[51] Int. Cl.[4] ............... G11B 21/10; G11B 21/02
[52] U.S. Cl. ....................... 360/75; 360/27; 360/77; 369/43
[58] Field of Search ................ 360/75–78, 360/84, 27; 358/310, 328, 329, 330; 369/43

[56] References Cited

U.S. PATENT DOCUMENTS

| 3,730,983 | 5/1973 | Numakuna et al. | 358/328 |
| 3,845,500 | 10/1974 | Hart | 360/77 |
| 3,964,094 | 6/1976 | Hart | 360/77 |
| 4,110,799 | 8/1978 | Bergmans et al. | 360/77 |
| 4,141,047 | 2/1979 | Kambara et al. | 360/107 X |
| 4,190,859 | 2/1980 | Kinjo | 369/43 |
| 4,208,671 | 1/1980 | Ozawa et al. | 358/323 X |
| 4,297,733 | 10/1981 | Sanderson | 360/77 |
| 4,303,953 | 12/1981 | Sanderson | 360/77 X |

FOREIGN PATENT DOCUMENTS

| 2741030 | 3/1978 | Fed. Rep. of Germany . |
| 2740770 | 3/1978 | Fed. Rep. of Germany . |
| 2338542 | 8/1977 | France . |
| 2364581 | 4/1978 | France . |
| 2384320 | 10/1978 | France . |
| 4952610 | 5/1977 | Japan . |
| 53-11612 | 10/1978 | Japan . |
| 2013939 | 2/1978 | United Kingdom . |
| 1518822 | 7/1978 | United Kingdom | 369/43 |

OTHER PUBLICATIONS

Matsushita Denki Sangyo K.K., "Magnetic Reproducer", Apr. 14, 1979, p. 14E104, JP No. 54 21809.
Neues aus der Technik, vol. 1978, No. 6, Dec. 1978, Wurzburg (DE), "Spurfolgesystem".
Funkschau, vol. 51, No. 16, Aug. 1979, Munich (DE), "Video 2000—ein neues Bildaufzeichnungssystem", pp. 72-76.
Sony K.K., "Recorder-Reproducer for Picture Signal", May 24, 1978, p. 2366E78, JP No. 43 33108.
Nippon Victor K.K., "Tracking Control System in Information Signal Recorder-Reproducer", p. 107E151, JP No. 54 115114.
Matsushita Denki Sangyo K.K., "Tracking Control Device of Magnetic Picture Recording Reproducer", p. 77E127, JP No. 54 686614.

Primary Examiner—Aristotelis M. Psitos
Attorney, Agent, or Firm—Stevens, Davis, Miller & Mosher

[57] ABSTRACT

A control signal recording and reproducing system for exactly tracking a record track in a helical scan type VTR or the like is disclosed.

Intermittent pilot signals are recorded with the frequency spectra thereof being interleaved between adjacent tracks. In a reproducing operation, the main track pilot signals and the adjacent track pilot signals are separated by a comb type filter, and using a time position of the main pilot signals as a reference, the adjacent track pilot signals are separated in-time to the front adjacent track pilot signal and the rear adjacent track pilot signal to detect the direction of a tracking error.

13 Claims, 32 Drawing Figures

TRACKING CONTROL SYSTEM USING INTERMITTENTLY RECORDED PILOT SIGNALS

The present invention relates to a tracking control signal recording and reproducing system for enabling a reproducing means such as a magnetic head to exactly track a record locus, in a reproducing operation, in a magnetic recording and reproducing apparatus.

Many approaches have been proposed to a tracking error detection system for a rotating head type video tape recorder in which a magnetic head is mounted on an electro-mechanical transducing element such as a piezo-electric element and a control signal is applied to the piezo-electric element to electrically control a level of the rotating magnetic head in order to maintain an exact tracking in the reproducing operation.

The proposed tracking error detection systems may be classified as follows: (1) a system using an auxiliary head, (2) a system for detecting a direction of a tracking error by a variation in an output level while finely moving a reproducing head widthwise of a record track in the reproducing operation (search method) and (3) a system for recording a pilot signal for detecting a tracking error.

The auxiliary head system (1) has disadvantages in that the additional (tracking error detecting) head must be accurately mounted on the common piezo-electric element and an additional rotary transformer and pre-amplifier for taking out an error signal are needed; hence the construction is complex and expensive.

In the search system (2), a response speed of the piezo-electric element is restricted by a mass of the magnetic head so that the control cannot freely follow a curve of the record track. In an azimuth recording system (employed in a VHS system VTR) in which a gap angle of the head relative to the length of the record track is not equal to 90 degrees, it is difficult to use the search system because the vibration of the head in the direction of the width of track in the reproducing operation appears as a variation of a time axis in the reproduced signal.

Many proposals have been made for the system (3). They are classified as follows:

(3-i) Continuous pilot signals of different frequencies are recorded. In the reproducing operation, a direction of a tracking error is detected by a pilot signal which is different from the pilot signal to a main track by making use of the fact that the frequency of the pilot signal to the main track is different from the frequencies of pilot signals reproduced from the both adjacent tracks.

(3-ii) Pilot signals are recorded intermittently. In reproducing operation, levels of cross-talk pilot signals from the both adjacent tracks are detected with reference to a timing of a pilot signal from the main track to detect the direction of the tracking error.

In the system (3-i), three or more pilot signal frequencies are usually required and a substantial area for recording the pilot signals is required, which reduces an area for recording a video signal. In addition, many narrow band filters for separating the three or more pilot signals and three or more pilot signal generating circuits are required. An example of this system is disclosed in Japanese Patent Laid-Open specification No. 53-116120.

An example of the system (3-ii) is proposed in Japanese Patent Laid-Open specification No. 49-52610. In the proposed example, the pilot signals are recorded intermittently on the record tracks with the record areas of the pilot signals for adjacent tracks being not overlapped or aligned with each other and the record areas of the pilot signals for the both adjacent tracks being not overlapped with each other. When the track having the pilot signal thus recorded is reproduced, a timing of the pilot signal reproduced from the track Tn which is being scanned by the reproducing head is used as a reference because a reproduction level of the pilot signal recorded on the track Tn is largest, and the pilot signals reproduced from the tacks Tn−1 and Tn+1 are separated in time and a tape transport control system is controlled to render the levels of the pilot signals reproduced from the tracks Tn−1 and Tn+1 to be equal or a level of the magnetic head mounted on the piezo-electric element is controlled to cause the magnetic head to exactly track the track Tn. Difficulties in implementing the proposed system reside in; (a) when a pilot signal of a very low frequency in the order of 100 KHz is recorded, the pilot signal is reproduced not only in the area of track width Hw of the recording head but also in a notch area formed at a gap of the magnetic head (when the pilot signal is of low frequency a recording wavelength is long and hence the signal level reproduced by the notch area is not neglegible), which renders the separation from the main track pilot signal unstable. In a narrow track head, the notch area is unavoidable in view of a magnetic characteristic and abrasion. (b) When an azimuth recording system (employed in VHS system etc) in which gap angles of heads in a two-rotary head type VTR are different is used, the reproducing head must have the same gap angle as the recording head. When the low frequency pilot signal is used, it is not possible to distinguish the gap angle of the recording head by which the track being reproduced by the reproducing head was recorded. More particularly, when two heads, head A and head B, having different gap angles are used for recording and reproducing and if the head A which is to scan the track Tn scans more closely to the track Tn−1 (or Tn+1) than to the track Tn, the head A will be controlled to exactly track the track Tn−1 (or Tn+1) so that the signal is reproduced by the gap angle different from the gap angle of the record head and hence correct reproduction is not attained. When the pilot signal of a high frequency in the order of 500 KHz or higher is recorded, the problem of reproduced signal level from the notch area discussed in (a) is resolved, but in order to resolve the problem of wrong azimuth track reproduction discussed in (b), a pilot signal of higher frequency, usally in the order of 1 MHz or higher must be used. This is not desirable from a view point of the video signal recording band (because the video signal recording band is limited).

It is an object of the present invention to provide a recording system of a control signal in accordance with a tracking error and a detecting system of the tracking error to enable exact tracking of a record track in a reproducing operation in an apparatus for recording a signal as sequentially adjacent record loci such as a helical scan type VTR, a system for detecting the tracking error in a stable manner using a single or double frequency pilot signal and a system for reducing cross modulation with a video signal by using the pilot signal.

In accordance with the present invention, for example, in a two-head helical scan type VTR, intermittent pilot signals serving as a tracking control signal in the reproducing operation are recorded in overlap with a video signal as shown in FIG. 1. The pilot signals in the respective tracks are recorded intermittently in every other horizontal scan line with the frequency spectra of the pilot signals recorded on the adjacent tracks being interleaved with respect to each other. In the reproducing operation, the pilot signal reproduced from the main track is separated from the pilot signals reproduced from the adjacent tracks by a comb type filter which uses a two-horizontal scan period delay line, and by using a time position of the main track pilot signal as a reference, the adjacent track pilot signals are separated in time to a front adjacent track pilot signal and a rear adjacent track pilot signal, and the levels of the front and rear adjacent track pilot signals are compared to detect a tracking error.

The present system is simpler in signal processing and more stable in the detection of the tracking error than a prior art pilot signal recording system.

Figure 1:
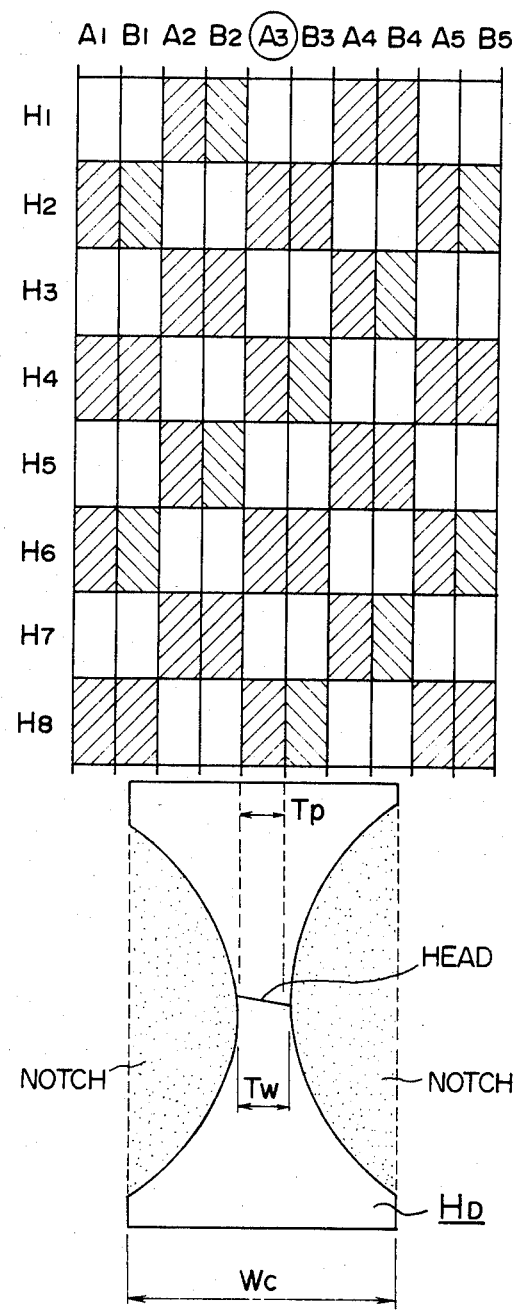
FIG. 1 shows an example of a record pattern of a pilot signal in accordance with the present invention and a relation thereof to a magnetic head.
Figure 3:
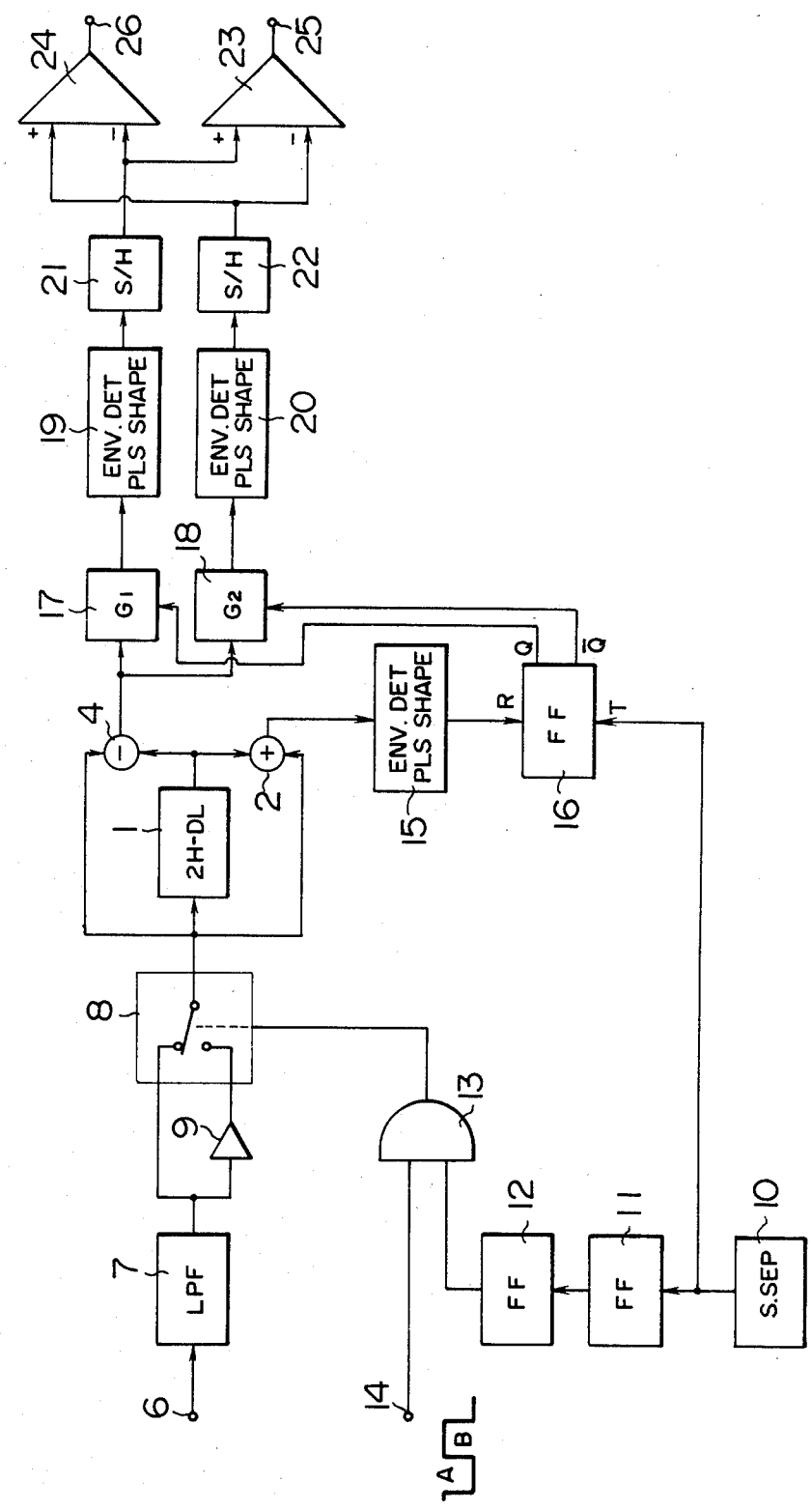
FIG. 3 shows a block diagram of one embodiment of a tracking error detection circuit of the present invention.
Figure 4:
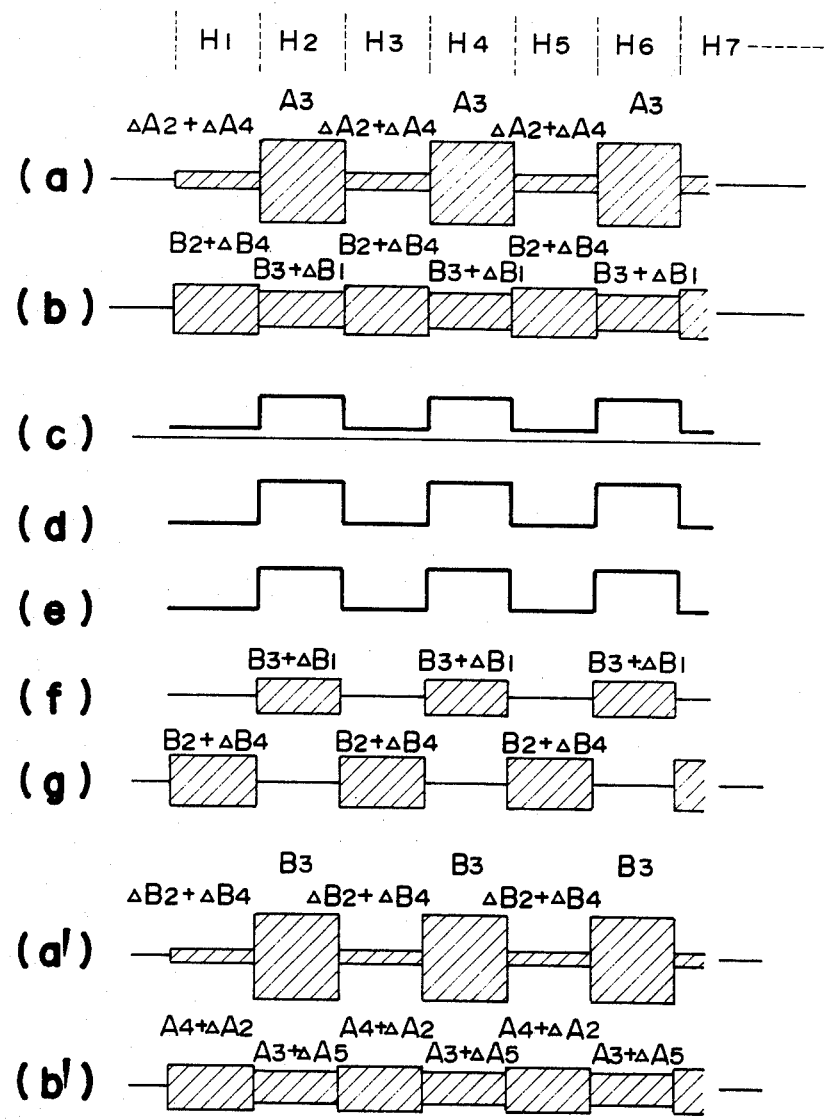
Figure 6:
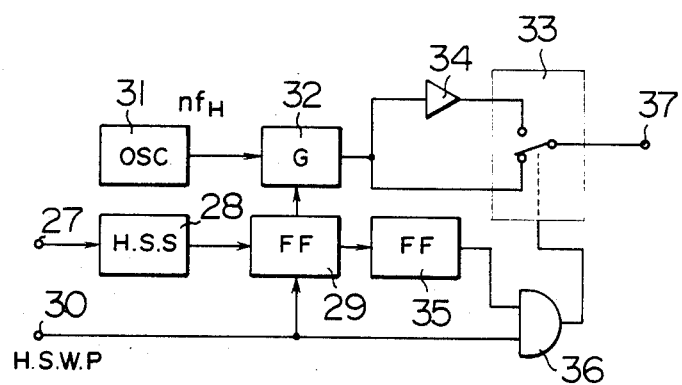
Figure 7:
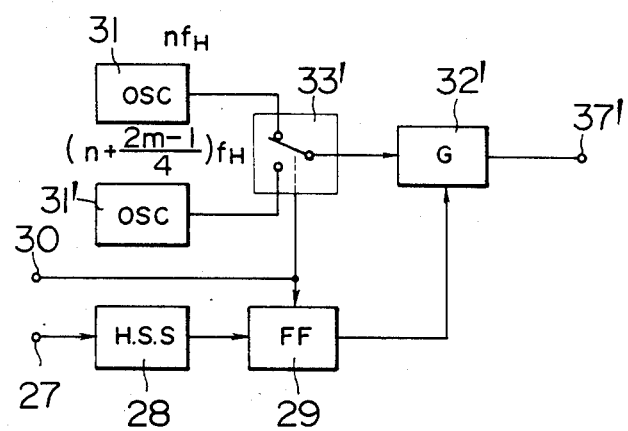
Figure 8:
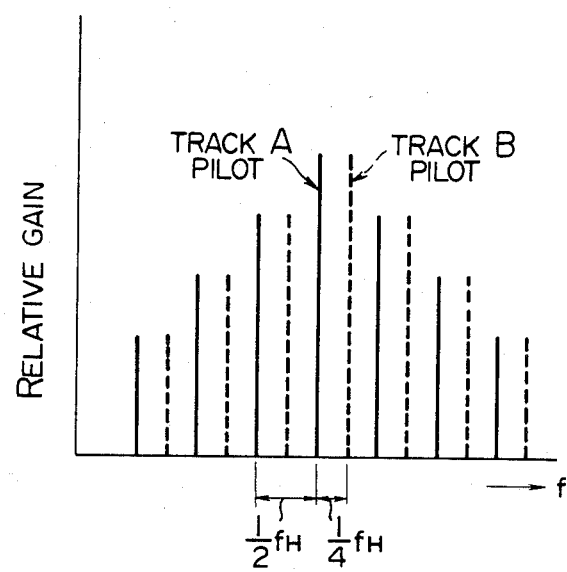
Figure 10:
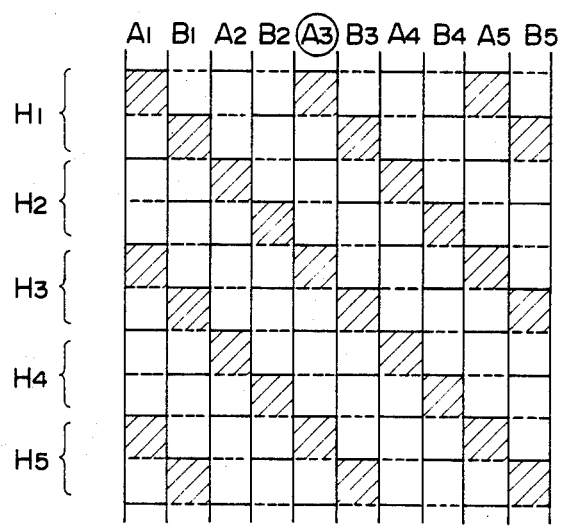
Figure 9:
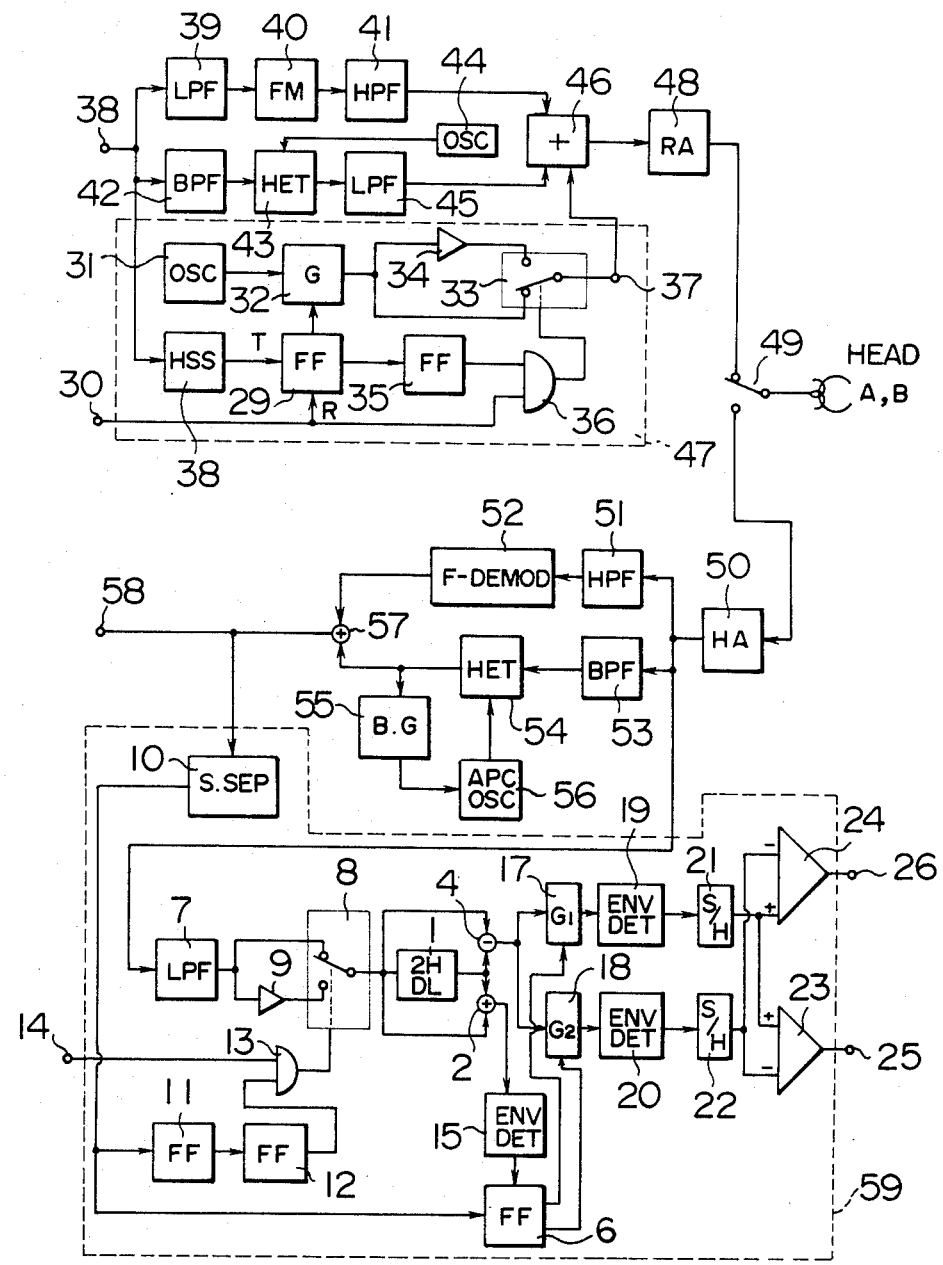
Figure 11:
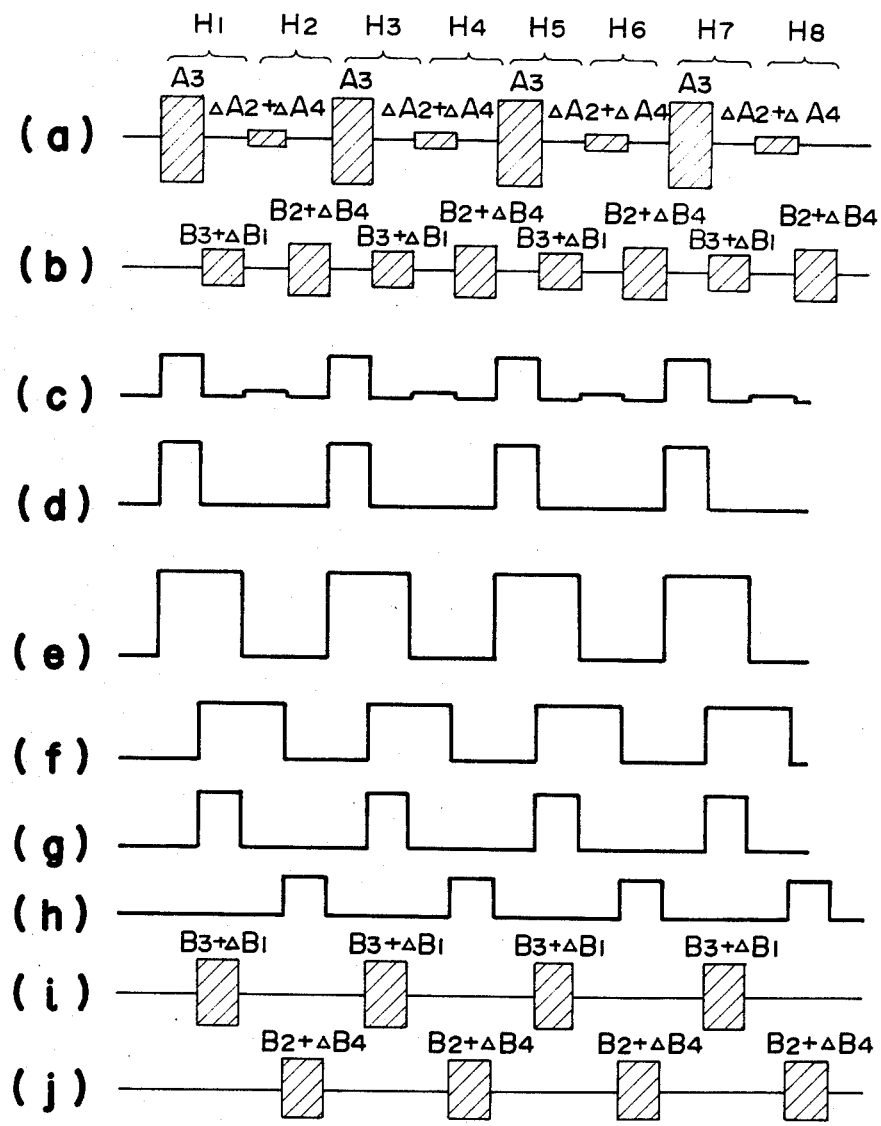
Figure 12:
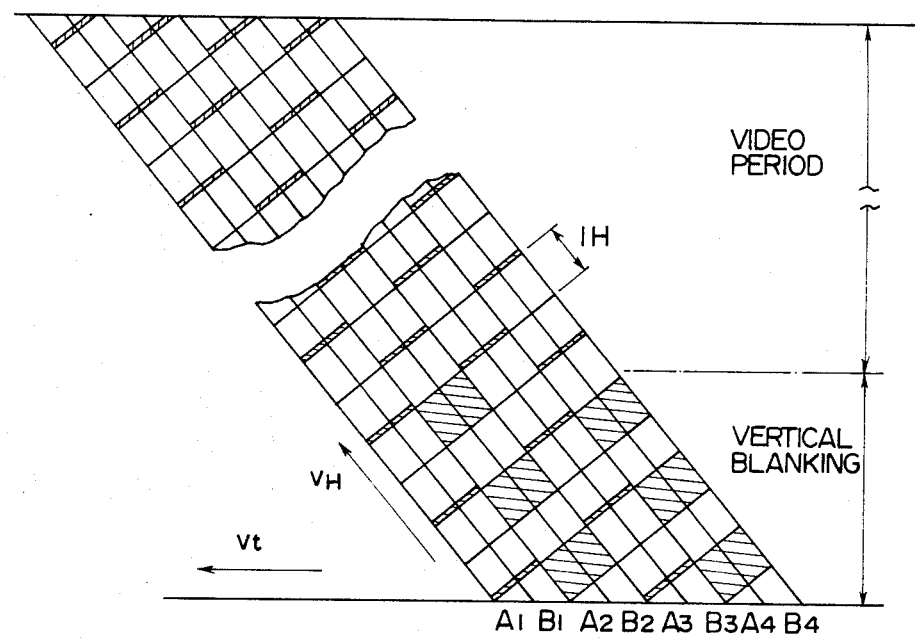

FIGS. 4, including (a)–(g), a' and b', show waveforms for explaining the operation of the circuit of FIG. 3;

FIGS. 5a to 5d illustrate conditions for preparing the record pattern of the pilot signal shown in FIG. 1;

FIG. 6 shows a circuit block diagram of one embodiment of a pilot signal generating circuit in a recording operation;

FIG. 7 shows a circuit block diagram of another embodiment of the pilot signal generating circuit in the recording operation;

FIG. 8 shows a spectrum of a recorded pilot signal in accordance with the present invention;

FIG. 9 shows a block diagram of one embodiment of a signal processing circuit of a recording and reproducing system when the present invention is applied to a home use video tape recorder;

FIG. 10 shows another example of a recorded pattern of the pilot signal in accordance with the present invention;

FIGS. 11, including (a)–(j), show signal waveforms of a reproduced pilot signal process circuit produced when a track recorded with the pattern shown in FIG. 10 is reproduced; and FIG. 12 shows a specific example of the recorded pattern of the pilot signal for enlarging a margin of error tracking.

FIG. 1 shows a specific example of a record pattern of a pilot signal for detecting a tracking error in accordance with the present invention.

In FIG. 1, record tracks $A_1$, $B_1$, $A_2$, $B_2$, $A_3$, $B_3$, . . . are sequentially recorded by a pair of rotating heads A and B having different gap angles with a record position of a horizontal synchronizing signal on each of the record tracks being aligned with the record positions of the horizontal synchronizing signals on the adjacent tracks (H alignment).

Symbols $H_1$, $H_2$, $H_3$, . . . represent respective one horizontal scan period sections on the respective record track. No pilot signal is recorded on the blank horizontal synchronization sections and pilot signals are recorded only on hatched sections.

Thus the pilot signals recorded in the front adjacent track with respect to a selected track $A_3$ (e.g., track $B_2$ toward track $A_3$ currently reproduced by the head A as mentioned later) are not aligned in the direction transverse to the record tracks with the pilot signals recorded in the rear adjacent track with respect to track $A_3$ (track $B_3$ toward track $A_3$), and the pilot signals are recorded in every other horizontal period in every track, and the pilot signals recorded in every other track are recorded to form a zig-zag pattern across related two tracks (e.g., $B_2$ and $B_3$). The pilot signal of the tracks recorded by the head A are recorded with a constant phase (e.g., zero degree), and the pilot signals of the tracks recorded by the head B are recorded with the pilot signal of 0 degree phase and the pilot signal of 180 degrees phase alternately at every two horizontal scan periods. It is simple in constructing a circuit to select the frequency $f_p$ of the pilot signal recorded to be equal to $n \cdot f_H$ (where n is an integer and $f_H$ is a horizontal synchronizing signal frequency). (The frequency $f_p$ may be selected to be equal to $(n-\frac{1}{2}) \cdot f_H$, but the example of $f_p = n \cdot f_H$ is explained hereinafter.)

A track width Tw of the magnetic head $H_D$ is approximately equal to a track pitch $T_p$ or slightly wider (as described later, the present invention is applicable even when Tw is slightly narrower than $T_p$, if the low frequency pilot signal $f_p$ in the order of 100 KHz is recorded.) A core width Wc of the magnetic head contacting with a magnetic tape is narrower than 7 Tp (Wc < 7 $T_p$).

Figure 2:
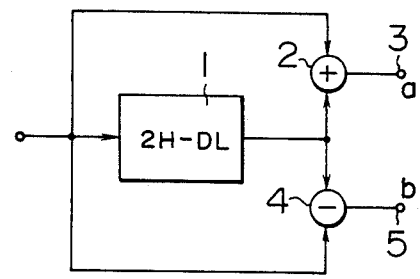
FIG. 2 shows a comb type filter used to separate a main track signal from adjacent track signals.

When the pilot signal shown in FIG. 1 is recorded on the tape, the reproduction of the record track $A_3$ by the head A is now discussed. The signal reproduced by the head A is applied to a comb type filter using a two-horizontal scan period delay line (2H-DL) 1 as shown in FIG. 2, and signals shown in FIGS. 4a and 4b are produced at an output terminal 3 of an adder 2 and an output terminal 5 of a subtractor 4, respectively. In FIG. 4, signals $A_3$, $B_2$, $B_3$ represent the pilot signals reproduced from the tracks $A_3$, $B_2$ and $B_3$, respectively, and signals $\Delta A_2$, $\Delta A_4$, $\Delta B_1$ and $\Delta B_4$ represent signals reproduced from the tracks $A_2$, $A_4$, $B_1$ and $B_4$, respectively, but the reproduced levels thereof are low. By the comb type filter, only the signal component recorded by the head A is separated by the adder and only the signal component recorded by the head B is separated by the subtractor.

In FIG. 4a, since $A_3 > \Delta A_2 + \Delta A_4$, the position on the track A on which the pilot signal $f_p$ is recorded can be identified. Using the identified position as a reference, the signals $B_2 + \Delta B_4$ and $B_3 + \Delta B_1$ can be separated from the signal b. Since $B_2 \gg \Delta B_4$ and $B_3 \gg \Delta B_1$, (the signals $B_2$ and $B_3$ are large because they are in the track of the magnetic head A but the signals $B_4$ and $B_1$ are relatively low because the tracks $B_4$ and $B_1$ are three track pitch away from the track $A_3$ reproduced by the head), $B_2 + \Delta B_4 \approx B_2$ and $B_3 + \Delta B_1 \approx B_3$. Thus the signals $B_2$ and $B_3$ can be separated. By comparing the magnitudes of the signals $B_2$ and $B_3$, it can be determined whether the head A reproducing the track $A_3$ is closer to the track $B_2$ (leftward) or to the track $B_3$ (rightward), and an exact tracking is attained by controlling the level of the head A such that the reproduced signal levels from the track $B_2$ and the track $B_3$ become equal. By controlling the reproduced signal processing circuit such that the output at the output terminal of the comb type filter of FIG. 2 assumes a waveform a' in FIG. 4 and the output at the output terminal 5 assumes a waveform b' in FIG. 4, when the head B reproduces the track B$_3$, an exact tracking can be attained for the reproduction by the head B. In this case, only the signal component of the track recorded by the head B is produced at the output of the adder circuit of the comb type filter and only the signal component of the track recorded by the head A is produced at the output of the subtractor circuit. In this manner, the track components recorded by the head A and the head B are separated.

FIG. 3 shows a block diagram of the reproduced pilot signal processing circuit. In FIG. 3, numeral 6 denotes a signal input terminal from a reproducing preamplifier. The pilot signal f$_p$ is separated from the input signal by a low-pass filter (LPF) 7. The output from the LPF 7 is, on one hand, directly supplied to one input terminal of a switching circuit 8 and, on the other hand, supplied to the other input terminal of the switching circuit 8 through an inverter 9. The output of the switching circuit 8 is supplied to the comb type filter described above (comprising the 2H-DL 1, the adder circuit 2 and the subtractor circuit 4). On the other hand, two-stage flip-flop circuits 11 and 12 are triggered by a horizontal synchronizing signal in the reproduced signal which is separated by a horizontal synchronizing signal separation circuit 10, to produce a pulse of 50% - 50% duty cycle and a frequency of $\frac{1}{4}$ f$_H$, which pulse is supplied to one input of an AND circuit 13. A head switching pulse (having a frequency of $\frac{1}{2}$ f$_v$, where f$_v$ is a field frequency) generated by a head rotation phase pulse is applied to the other input of the AND circuit 13 from a terminal 14. The output of the AND circuit 13 is always LOW level when the head A contacts to the tape, and produces HIGH signal and LOW signal alternately at an interval of two horizontal scan period when the head B contacts to the tape. The output of the AND circuit 13 is supplied to the switching circuit 8 so that when the output of the AND circuit 13 is a LOW level the signal of the LPF 7 is directly supplied to the comb type filter and when the output of the AND circuit 13 is a HIGH level the output of the LPF 7 is supplied through the inverter 9. The output pilot signal of the switching circuit 8 thus produced is supplied to the comb type filter 1 comprising the 2H-DL 1, the adder circuit 2 and the subtractor circuit 4. Accordingly, when the head A is reproducing, the signals (a) and (b) in FIG. 4 are produced at the output terminals 3 and 5 of the comb type filter, respectively, and when the head B is reproducing, the signals (a') and (b') of FIG. 4 are produced.

The signal at the output terminal 3 of the comb type filter is envelope-detected and shaped by a circuit 15 to produce an envelope-detected waveform (c) of FIG. 4 and a reshaped signal (d) of FIG. 4. On the other hand, a flip-flop circuit 16 which is triggered by the horizontal synchronizing signal separated by the horizontal synchronizing signal separation circuit 10 is reset by the output signal (d) of the shaping circuit 15 so that the output Q ((e) in FIG. 4) of the flip-flop circuit 16 assumes HIGH level when the signal (d) is HIGH level.

The pulses from the outputs Q and $\overline{Q}$ of the flip-flop circuit 16 are supplied to gate circuits 17 and 18, respectively. On the other hand, the signal from the output terminal 5 of the comb type filter is supplied to the inputs of the gate circuits 17 and 18 so that the gate circuits 17 and 18 gate the input signal when the pulses Q and $\overline{Q}$ are a HIGH level, respectively. The outputs f and g of the gate circuits 17 and 18 are supplied to envelope detection circuits 19 and 20, respectively, and the outputs therefrom are supplied to sample-hold circuits 21 and 22, respectively.

The outputs of the sample-hold circuit 21 is supplied to ⊕ input of a differential amplifier 23 and a ⊖ input of a differential amplifier 24 while the output of the sample-hold circuit 22 is supplied to a ⊖ input of the differential amplifier 23 and a ⊕ input of the differential amplifier 24.

The relations between the output levels of the gate circuits G$_1$ 17 and G$_2$ 18 and the directions of the tracking error with respect to the reproducing head A and B are shown in Table 1 below.

TABLE 1

| Reproducing Head | Levels of G$_1$ and G$_2$ | Direction of Tracking Error |
|---|---|---|
| A | G$_1$ > G$_2$ | Right |
|   | G$_1$ < G$_2$ | Left |
| B | G$_1$ > G$_2$ | Left |
|   | G$_1$ < G$_2$ | Right |

In the reproduction by the head A, the direction of the tracking error is right when G$_1$>G$_2$ and left when G$_1$<G$_2$, and in the reproduction by the head B, the direction of the tracking error is left when G$_1$<G$_2$ and right when G$_1$<G$_2$. Thus, the directions are opposite for the head A and the head B.

Accordingly, by using the output 25 of the differential amplifier 23 as a level control signal for the head A and using the output 26 of the differential amplifier 24 as a level control signal for the head B, the direction of the tracking error and the polarity of the control signal are matched and the exact reproducing tracking is attained when the D.C. levels at the outputs 25 and 26 are zero.

A recording signal processing circuit for recording the pilot signal in the record pattern shown in FIG. 1 is now explained.

Figure 5A:
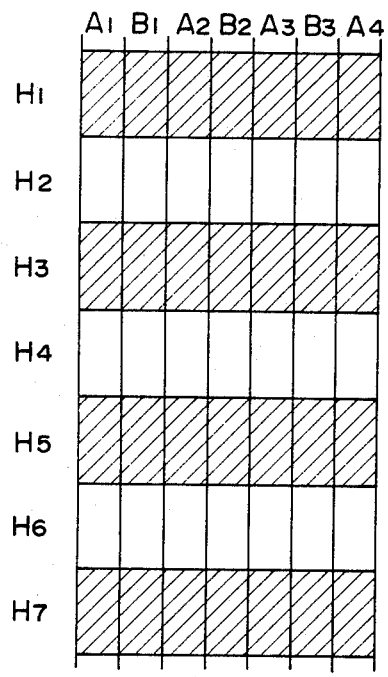
Figure 5C:
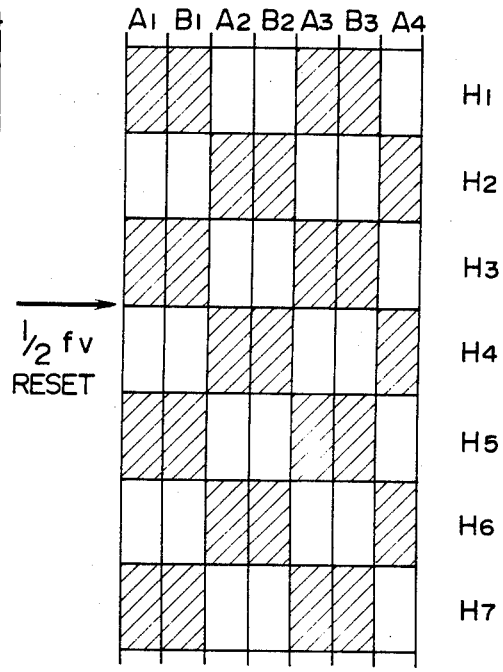
Figure 5B:
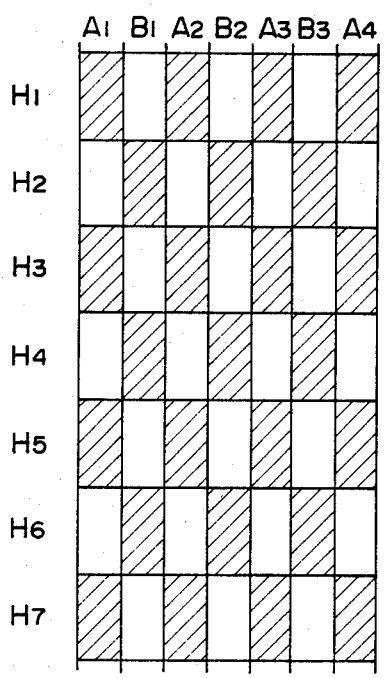
Figure 5D:
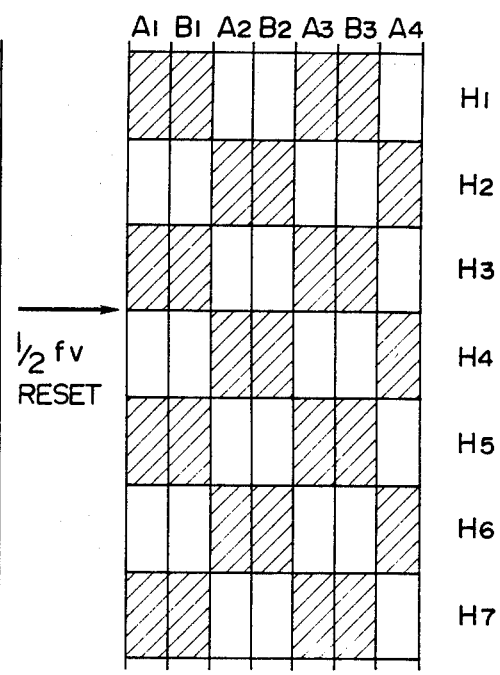

When a television signal is recorded in a two-rotating head type VTR with the recording positions of the horizontal synchronizing signals of adjacent tracks being aligned (H alignment—a condition of the H alignment is attained by appropriately selecting a relation among a tape width W on which the video signal is recorded, a tape speed u and a diameter D of a rotating head cylinder, as is well known in the art), if the pilot signals are recorded at every other horizontal scan period, two cases occur, that is, in the first case the record positions of the pilot signals of the adjacent tracks align as shown in FIG. 5a and in the second case the record positions of the pilot signals of the adjacent tracks do not align. In any case of FIGS. 5a and 5b, in order to change the record pattern to the record pattern shown in FIG. 1, the patterns are reset by a pulse of a frame period to shift the record positions by one horizontal scan period for each frame. As a result, the patterns shown in FIGS. 5c and 5d are produced, which have the record positions of the pilot signals matched with the pattern of FIG. 1. In the case of FIG. 5a, the pattern is reset at the transition from the head B to the head A, and in the case of FIG. 5b the pattern is reset at the transition from the head A to the head B. With the record positions of FIGS. 5c and 5d, the pilot signals are recorded while shifting the phase of the pilot signal recorded by the head B by 180 degrees (polarity inversion) at every two horizontal scan periods.

An example of a pilot signal recording and processing circuit is shown in FIG. 6.

In FIG. 6, numeral 27 denotes a video signal input terminal, numeral 28 denotes a horizontal synchronizing signal separation circuit, and numeral 29 denotes a flip-flop circuit which is triggered by the output of the circuit 28 to produce a pulse having a frequency of $\frac{1}{2} f_H$. The flip-flop 29 is reset by a head switching pulse having a frequency of $\frac{1}{2} f_v$ (where $f_v$ is a field frequency) applied to a terminal 30.

The output pulse of the flip-flop 29 is applied to a gate circuit 32 which gates a signal having a frequency of n $f_H$ from an oscillator 31. Thus the output of the gate circuit 32 produces the pilot signals corresponding to the record positions shown in FIG. 1.

The output of the gate circuit 32 is, on one hand, directly supplied to one input of a switching circuit 33 and, on the other hand, supplied to the other input of the switching circuit 33 through an inverter 34.

On the other hand, the output of the flip-flop 29 is supplied to another flip-flop 35 to produce a pulse of $\frac{1}{4} f_H$ output thereof, which is supplied to one input of an AND circuit 36. The head switching pulse applied to the terminal 30 is supplied to the other input of the AND circuit 36. Thus, the output of the AND circuit 36 is LOW level when the head A contacts to the tape, and produces HIGH level and LOW level alternately at every two horizontal scan periods when the head B contacts to the tape. By driving the switch 33 by the output pulse of the AND circuit 36, an output terminal 37 produces the pilot signal without phase change for the track recorded by the head A and the pilot signal having the polarity inverted at every two horizontal scan periods for the track recorded by the head B. In this manner the pilot signal record pattern as shown in FIG. 1 is generated. In FIG. 6, when the pilot signal is recorded by the head B, the polarity of the pilot signal is inverted at every two horizontal scan periods. It should be readily understood that the phase may be changed by 90 degrees in the same direction at every one horizontal scan period in order to attain the polarity inversion at every two horizontal scan periods when the pilot signal is recorded by the head B.

In recording the signals such that the signals recorded by the head A and the head B are separated by the comb type filter using the 2H-DL, the pilot signal recorded by the head A may have a frequency of $n \cdot f_H$ and the pilot signal recorded by the head B may have a frequency of $$\left( n + \frac{2m-1}{4} \right) \cdot f_H$$

(where n and m are integers). An example of such a recording circuit is shown in FIG. 7. The frequency of the first oscillator 31 is selected to $n \cdot f_H$ and the frequency of a second oscillator 31' is selected to $$\left( n + \frac{2m-1}{4} \right) \cdot f_H,$$

and those two signals are supplied to a switching circuit 33' which selects those two signals for each field by the head switching pulse applied to the terminal 30 and the selected signal is fed to a gate circuit 32'. The horizontal synchronizing signal is separated from the input video signal applied to the terminal 27 and the flip-flop 29 is triggered by the horizontal synchronizing signal. The flip-flop 29 is reset by the head switching pulse applied to the terminal 30. The output of the flip-flop 29 triggers the gate 32' which produces the pilot signal to be recorded, at an output terminal 37'.

When the recording pilot signal is recorded by the circuit of FIG. 7, the reproducing circuit of FIG. 3 may be used as it is.

Recording of the recording pilot signal by the circuit of FIG. 6 or FIG. 7 is identical from a viewpoint of a frequency spectrum. As shown in FIG. 8, the pilot signal recorded by the head A and the pilot signal recorded by the head B are interleaved with the spectra thereof being spaced by $\frac{1}{4} f_H$.

An embodiment of a circuit configuration when the present invention is applied to a chrominance signal low frequency band conversion recording system is now explained.

FIG. 9 shows the embodiment thereof in which numeral 38 denotes a video signal input terminal and a brightness signal separated by a low-pass filter (LPF) 39 is converted to a frequency modulated (FM) wave by a frequency modulation (FM) circuit 40, an output of which is supplied to one input of an adder circuit 46 through a high-pass filter (HPF) 41. On the other hand, a modulated chrominance signal separated by a band-pass filter (BPF) 42 is heterodyned with a signal from an oscillator 44 in a heterodyne circuit 43 and converted to a low frequency signal, which is supplied to a second input of the adder circuit 46 through a low-pass filter (LPF) 45. On the other hand, the pilot signal is generated by a circuit 47 (the constitutional elements of which are identical to those of the circuit in FIG. 6 and hence designated by the same reference numerals) and supplied to a third input of the adder circuit 46.

The sum output from the adder circuit 46 is supplied to be recorded by the magnetic head through a recording amplifier 48 and a record-reproduction selection switch 49.

In the reproducing operation, the signal fed through the magnetic head and the switch 49 is supplied to a pre-amplifier 50 and the output thereof is, on one hand, supplied to a HPF 51 where an FM brightness signal is separated, which is supplied to an FM demodulator 52 which in turn produces a reproducing brightness signal, which is supplied to one input of an adder circuit 57. On the other hand, a reproducing modulated chrominance signal separated in a BPF 53 is supplied to a heterodyne circuit 54 where it is heterodyned with a signal of an APC oscillator 56 to produce a modulated chrominance signal of a standard frequency, which is supplied to the other input of the adder circuit 57 which produces a reproduced composite color television signal at an output terminal 58. A color burst signal is separated in a burst gate circuit 55 by the output of the heterodyne circuit 54. The APC oscillator 56 is controlled such that the color burst signal has a reference phase.

On the other hand, the reproduced pilot signal is processed by the processing circuit (which is identical to the circuit of FIG. 3 and hence designated by the same numerals) which produces control signals to control the heights or levels of the heads A and B at terminals 25 and 26, respectively.

In the circuit of FIG. 9, the pilot signal frequency is set to a low frequency around 100 KHz, which is out of the band of the low frequency band converted modulated chrominance signal.

The record band of the pilot signal may be set to a frequency band between the modulated chrominance signal and the FM brightness signal. In this case, the filter 7 for separating the pilot signal shown in FIG. 9 should be changed to a BPF.

It should be understood that when the record positions of the horizontal synchronizing signals of the adjacent tracks are aligned as shown in FIG. 1 the pilot signals may be recorded only in the horizontal synchronizing signal period and the same frequency band as the low frequency converted chrominance signal may be used.

In the illustrated embodiment, the record positions of the horizontal synchronizing signals of the adjacent tracks are aligned. However, the present invention is not limited to the case where the horizontal synchronizing signals are recorded in alignment but it is applicable to a case where the horozontal synchronizing signals are not aligned.

As an example of non-H alignment, FIG. 10 shows an embodiment in which the record positions of the horizontal synchronizing signals of one track are positioned at mid-points of the horizontal synchronizing periods of the immediately adjacent track. The application of the present invention of this case is now explained. Hatched areas in FIG. 10 show the areas on which the pilot signals are recorded and horizontal solid lines indicate the record positions of the horizontal synchronizing signals. In each track, the pilot signal is recorded in only one half of one horizontal synchronizing period in every other horizontal synchronizing period.

A manner in which the signal reproduced from the track $A_3$ on the tape thus recorded is processed is now explained.

FIGS. 11, (a) and (b) show reproduced envelopes of the pilot signals at a sum output and a difference output of a 2H correlated comb type filter when the head A reproduces the track $A_3$. Symbols $A_3$, $B_2$, $B_3$, $\Delta A_2$, $\Delta A_4$, $\Delta B_1$ and $\Delta B_4$ represent the pilot signals reproduced from the corresponding record tracks and symbol $\Delta$ indicates that the level of that signal is lower than the level of other signals. FIG. 11 (c) shows a waveform derived by envelope detecting the signal (a), and FIG. 11 (d) is derived by shaping the signal (c) to produce a pulse corresponding to the period of the pilot signal $A_3$. FIG. 11 (e) shows a pulse having a frequency of $\frac{1}{2} f_H$ which is derived by triggering a flip-flop by the reproduced horizontal synchronizing signal.

A monostable multivibrator is triggered by the fall of the pulse (d) to produce a pulse (f) having a duration corresponding to one horizontal scan period. A signal (g) is produced by the pulses (e) and (f), through an AND circuit, and a signal (h) is produced by the pulses (e) and (f) through a NOR circuit.

Pilot signals (i) and (j) are produced by gating the signal (b) by the pulses (g) and (h), respectively. Since the signals $\Delta B_1$ and $\Delta B_4$ are sufficiently smaller than the signals $B_3$ and $B_2$, the signal (i) represents a cross-talk pilot signal from the track on the right of the track $A_3$ and the signal (j) represents a cross-talk pilot signal from the track on the left of the track $A_3$. Accordingly, by rectifying those pilot signals and controlling the level of the reproducing head such that a difference between the levels of the rectified signals is minimized, the head A can exactly trace the track $A_3$. The reproduction by the head B can be similarly explained.

The signal processing circuit for FIG. 11 is essentially identical to that of FIG. 3 and hence detail thereof is omitted here. The significant difference is that a monostable multivibrator, an AND circuit and a NOR circuit are additionally provided between the flip-flop 16 and gate circuits 17 and 18 in FIG. 3.

A recording circuit for recording the pilot signal in the manner shown in FIG. 1 may be similar to that of FIG. 6 or FIG. 7. Only the difference is that the pilot signal is gated for only one half of the horizontal synchronizing signal period in which the pilot signal is to be recorded. To this end, a monostable multivibrator may be inserted at the gate pulse input terminal of the gate circuit 32 or 32'.

As an expansion of recording the pilot signals in the pattern shown in FIG. 10, the pilot signals may be recorded only in horizontal blanking periods or horizontal synchronizing pulse periods in every other horizontal scan period, to attain a similar effect. When the pilot signal is recorded in overlap with the video signal, a cross modulation occurs between these signals, which interferes with the video signal. When the pilot signal is recorded only in the horizontal blanking period or horizontal synchronizing pulse period, the cross modulation, if it occurs, does not appear on a screen image and hence the quality of image is not deteriorated.

While the patterns shown in FIGS. 1 and 10 have been discussed, there are many other record patterns to which the present invention is applicable, in which the pilot signals of the track recorded by the head A and the track recorded by the head B are separated by the comb type filter having the 2H-DL to detect the tracking error. Depending on a particular type of pattern, the signal processing circuit may slightly differ but a basic configuration is identical to that described above.

A method for expanding a margin for an abnormal tracking error which may take place when the levels of the reproducing heads are not equal.

FIG. 12 shows another embodiment of the present invention. The tracking error detecting pilot signals are recorded only in horizontal blanking periods in a video period. On the other hand the pilot signals are recorded only in horizontal blanking periods for tracks $A_1$, $B_1$, $A_3$, $B_3$, etc. and in substantially full horizontal scan periods for tracks $A_2$, $B_2$, $A_4$, $B_4$, etc., in vertical blanking periods. That is, in the vertical blanking periods, the pilot signals are recorded alternately only in the horizontal blanking periods and in substantially full horizontal scan periods in every two tracks. The condition to process the pilot signals is same as that of the previous examples. In FIG. 12, the arrow marks of $v_H$ and Vt represent the direction of scan of the rotating head and the direction of run of the tape.

An advantage of recording the pilot signals in the manner shown in FIG. 12 resides in that the abnormal tracking can be detected and the margin for the correct tracking is expanded. When the signals are reproduced by the two rotating magnetic heads A and B, the signals are reproduced in the order of tracks $A_1$, $B_1$, $A_2$, $B_2$, $A_3$, $B_3$, ... in a normal tracking condition, but if the head A reproduces the track $A_1$ and then the head B reproduces the track $B_2$, an error signal which is identical to that produced when the track $B_1$ reproduced when the pilot signal record pattern as shown in FIG. 1 or FIG. 10 is used. Accordingly, it is not possible to detect the abnormal tracking condition. On the other hand, when the pilot signals are recorded such that the record pattern changes in every two tracks in the vertical blanking periods as shown in FIG. 12, the reproduction of the track $B_1$ and the reproduction of the track $B_2$ can be distinguished. Accordingly, if the track $B_2$ is reproduced after the track $A_1$ had been reproduced, the difference in the pilot signals in the vertical blanking periods is detected (since the pilot signals are recorded only in the horizontal blanking periods for the tracks $A_1$ and $B_1$ but the pilot signals are recorded in substantially full horizontal scan periods for the track $B_2$, the difference between the record patterns of the pilot signals can be detected if the track jumps from $A_1$ to $B_2$) and the head can be returned to the normal track $B_1$.

In a normal tracking condition, the track $B_{2n-1}$ is reproduced after the track $A_{2n-1}$ and the track $B_{2n}$ is reproduced after the track $A_{2n}$, but in an abnormal tracking condition, the track $B_{2n-2}$ or $B_{2n}$ may be reproduced after the track $A_{2n-1}$, or the track $B_{2n-1}$ or $B_{2n+1}$ may be reproduced after the track $A_{2n}$. With the pilot signal record pattern as shown in FIG. 12, such an abnormal tracking condition can be detected by detecting the difference betwen the pilot signal formats in the vertical blanking periods for the head A and the head B, and the normal tracking condition can be restored by the detected signal. With this record pattern, a tracking margin is provided to the extent of the track $B_3$ when the track $B_1$ is to be reproduced (but the track $B_1$ and the track $B_3$ cannot be distinguished). Thus, the abnormal tracking margin of as many as four track pitches is provided, which is twice as large as the abnormal tracking margin of two track pitches provided when the record pattern shown in FIG. 1 is used.

FIG. 12 shows an example of expanding the abnormal tracking margin. Alternatively, the abnormal tracking margin may be expanded by inserting track address dignals in the vertical blanking periods or inserting pilot signals of a different frequency in every two tracks in the vertical blanking periods.

Since the pilot signal frequency is generally set to a low frequency, a conventional supersonic delay line cannot be used in the 2H-DL (although it can be used by converting the frequency), but the 2H delay can be readily attained by a charge transfer device such as BBD or CCD.

It should be understood that the tracking error detection signal may be used to control the tape speed to effect the tracking.

While the two-head type apparatus has been explained, the present invention is equally applicable to an apparatus having more than two heads. In a single head type VTR in which one field of television signal is recorded or reproduced in one revolution of the head, the same construction as that of the two-head type apparatus may be used by regarding that the single head changes to the head A and the head B alternately for every revolution. The present invention is applicable to not only the rotating head type video tape recorder but also a disc recorder. In this case, by regarding that the head changes from the head A to the head B for every rotation of the disc, the same construction as that of the two-head type VTR can be used. The present invention is applicable to not only recording of a television signal but also recording of a sound signal or other information signals.

In accordance with the present invention, the pilot signals for detecting the tracking error are recorded intermittently with the spectra thereof of the adjacent tracks being frequency-interleaved, and in the reproducing operation, the pilot signal of the main reproducing track and the pilot signals of the track which is away from the main track by an even number of tracks and the track which is away from the main track by an odd number of tracks are separated, and using the reproducing time point of the pilot signal of the main track as a reference, the pilot signals reproduced from the front (left) and rear (right) adjacent tracks are separated in time, and the levels of the reproducing heads are controlled such that the signal levels of the pilot signals reproduced from the front and rear adjacent tracks become equal.

Accordingly, the present invention offers the following effects and advantages over the prior art simple pilot signal recording system.

1. Since the pilot signal of the main track and the pilot signals of the front and rear adjacent tracks are completely separated by the comb type filter, the track recorded by the head A and the track recorded by the head B are distinguished, and a problem of the wrong track reproduction which would otherwise be encountered in the azimuth recording system is avoided.

2. The main track reproduced pilot signal is used only to identify the reference position. Since the S/N ratio for identifying the reference position is sufficiently high, the control operation is stable.

3. Since the tracking control signal is produced by simultaneously comparing the pilot signal reproduced from the front adjacent track and the pilot signal reproduced from the rear adjacent track to render the levels of those signals to be equal, the control is very stable to a variance of the circuit, a temperature drift and compatible reproduction, and the control is very accurate.

4. The recorded pilot signal may be of single (or double) frequency. Accordingly, the recording circuit may be simple and the reproducing circuit is also simple because no sharp filter is required.

5. When a low frequency pilot signal is used, the cross-talk pilot signal component reproduced by the notch area of the head is small such as $B_2 >> \Delta B_4$, $B_3 >> \Delta B_1$ as shown in f, g of FIG. 3. Accordingly, when a head having a wide core width Wc relative to the track width Tw is used, the component reproduced by the notch area can be neglected and hence a stable control signal is produced.

What is claimed is:

1. A tracking control pilot signal recording and reproducing system for controlling a position of a reproducing means relative to the tracks of a moving recorded medium which it reproduces, comprising:
means for supplying a main information signal to be recorded and reproduced;
means for generating two kinds of intermittent pilot signals, the frequency band of each being lower than that of the main information signal, the frequency spectra of said two kinds of intermittent pilot signals being frequency interleaved with each other and sharing almost the same frequency band;
means for recording said main information signal in a plurality of adjacent tracks mixed with one of said intermittent pilot signals on a (2N−1)th recording track and mixed with the other intermittent pilot signal on a 2Nth track, where N is an integer, N=1, 2, 3, . . . , on a recording medium;
means for arranging the recording positions of said intermittent pilot signals on the (2N−1)th track and (2N+1)th track, so they do not align in a direction transverse to the recorded tracks, and for arranging the recording positions of said intermittent pilot signals on the 2Nth track and (2N+2)th track so they do not align in a direction transverse to the recorded tracks;

means for reproducing said recorded signal;

means for separating reproduced pilot signals from the resulting reproduced signal;

means for separating from said reproduced pilot signals, the pilot signal of a main reproduced track and the pilot signals of front and rear adjacent tracks by using a comb filter;

gating means for separating the pilot signal of the front adjacent track from the pilot signal of the rear adjacent track, said gating means being responsive to gate pulses produced from the pilot signal timing of said main reproduced track;

means for comparing the level of the separated pilot signals of said front adjacent track and rear adjacent track; and means for controlling the position of said reproducing means relative to the tracks of said recording medium using a signal derived from the comparison of the levels of said front and rear adjacent track pilot signals.

2. A system according to claim 1, wherein said means for controlling controls at least one of the position of said reproducing means and the movement speed of said recording medium.

3. A tracking control pilot signal recording and reproducing system for controlling a position of a reproducing means relative to the tracks of a moving recorded medium which it reproduces, comprising:

means for supplying a main information signal to be recorded and reproduced;

means for generating two kinds of intermittent pilot signals, the frequency band of each being lower than that of the main information signal, the frequency spectra of said two kinds of intermittent pilot signals being frequency interleaved with each other and sharing almost the same frequency band, one of said intermittent pilot signals having a center frequency of $nf_H$ and its sideband spreading on both sides thereof with spectral components being spaced by an interval of $f_H/2$, the other intermittent pilot signal having a center frequency of $\{n+(2m-1)/4\} f_H$ and its sideband spreading on both sides thereof with spectral components being spaced by an interval of $f_H/2$, where n, m are integers and $f_H$ is a horizontal synchronizing frequency of a television signal;

means for recording said main information signal in a plurality of adjacent tracks mixed with one of said intermittent pilot signals on a (2N−1)th recording track and mixed with the other intermittent pilot signal on a 2Nth track, where N is an integer, N=1, 2, 3, . . . , on a recording medium;

means for arranging the recording positions of said intermittent pilot signals on the (2N−1)th track and (2N+1)th track, so they do not align in a direction transverse to the recorded tracks, and for arranging the recording positions of said intermittent pilot signals on the 2Nth track and (2N+2)th track so they do not align in a direction transverse to the recorded tracks;

means for reproducing said recorded signal;

means for separating reproduced pilot signals from the resulting reproduced signal;

means for separating from said reproduced pilot signals the pilot signal of a main reproduced track and the pilot signals of front and rear adjacent tracks by using a comb filter;

means for separating the pilot signal of the front adjacent track from the pilot signal of the rear adjacent track by gating the front and rear adjacent track pilot signal using a gating pulse produced from the main track pilot signal;

means for comparing the level of the separated pilot signals of said front adjacent track and rear adjacent track; and means for controlling the position of said reproducing means relative to the tracks of said recording medium using a signal derived from the comparison of the levels of said front and rear adjacent track pilot signals.

4. A system according to claim 3, wherein said means for separating said main reproduced track pilot signals from said adjacent track pilot signals comprises a comb filter having a two-horizontal scanning period delay line.

5. A system according to claim 3, wherein said main information signal is a television signal, and said intermittent pilot signals are generated in every other horizontal scanning period of said television signal.

6. A system according to claim 3, wherein said main information signal is a television signal, and said intermittent pilot signals are generated in every other horizontal blanking period of said television signal.

7. A system according to claim 3, wherein said means for controlling controls at least one of the position of said reproducing means and the movement speed of said recording medium.

8. A signal tracking control system for use with a recording and reproducing apparatus, said system including a recording apparatus comprising:

oscillator means for generating an oscillation signal of a frequency substantially equal to $nf_H$, where n is an integer and $f_H$ designates a horizontal sync signal frequency of a video signal;

means for gating the oscillation signal in sync with every other horizontal sync signal ($\frac{1}{2} f_H$) of the video signal;

switching means receiving a gated oscillation signal and being responsive at least to a first alternating pilot signal for switching between positions causing non-inversion and inversion of the gated oscillation signal to alternately produce a first tracking control intermittent pilot signal of a first phase and a second tracking control intermittent pilot signal having a phase which alternates between said first phase and an inversion thereof, said first and second intermittent pilot signals being produced in response to every other horizontal sync signal of the video signal, the frequency band of each of said first and second intermittent pilot signals being lower than that of the video signal and the frequency spectra of said first and second intermittent pilot signals being frequency interleaved with each other and sharing almost the same frequency band;

means for recording said video signal mixed with said first pilot signal in a (2N−1)th track and mixed with said second pilot signal in a 2Nth track of said plurality of adjacent tracks where N is an integer, such as N=1, 2, 3, . . . ;

means responsive to said alternating pilot signal for resetting said gating means to arrange the recording positions of the intermittent pilot signals on the (2N−1)th and (2N+1)th tracks so that they do not align in a direction transverse to the tracks, and to arrange the recording positions of the intermittent pilot signal on the 2Nth and (2N+2)th tracks so that they do not align in a direction transverse to the tracks, respectively;

said system including a reproducing apparatus, comprising:

means for reproducing recorded signals from the recording medium;

filter means for deriving a signal mixture of pilot signal components of a main reproduced track and front and rear adjacent reproduced tracks from the reproduced signals;

non-inversion/inversion switching means responsive at least to a second alternating pilot signal, for switching between positions causing non-inversion and inversion of the derived pilot signal components to alternately reproduce the first and the second intermittent pilot signals;

first separation means for separating a pilot signal component of the main reproduced track and pilot signal components of the front and rear adjacent tracks, wherein said separation means comprises a delay means for delaying the pilot signal components from said switching means by a 2H period, where H designates one horizontal scanning period of the video signal, an adder and a subtractor for respectively adding to and subtracting from the pilot signal components from said switching means the delayed pilot signal components to separate out the main reproduced track pilot signal component and the adjacent tracks pilot signal components, respectively;

second and third separation means for substantially separating the pilot signal components of the front and rear adjacent tracks respectively from said adjacent tracks pilot signal components in response to said main reproduced track pilot signal component and the horizontal sync signal;

comparator means for comparing levels of the separated pilot signal components of the front adjacent track and the rear adjacent track; and means for controlling the position of said reproducing means relative to the tracks of said recording medium using a signal derived from the comparison of the levels of said front and rear adjacent track pilot signals.

9. A system according to claim 8, wherein said means for controlling controls at least one of the position of said reproducing means and the movement speed of said recording medium.

10. A signal tracking control system for use with a recording and reproducing apparatus, said system including a recording apparatus comprising:

oscillator means for generating a first oscillation signal of a frequency substantially equal to $nf_H$, and second oscillator means for generating a second oscillation signal of a frequency substantially equal to $\{n+(2m31\ 1)/4\}\ f_H$, where n, m are integers and $f_H$ designates a horizontal sync signal frequency of a video signal;

gating means;

switching means responsive to a first alternating pilot signal for alternately connecting the first and the second oscillation signals to said gating means for gating to the output of said gating means, the connected oscillation signal in every other horizontal scanning period of the video signal and to thereby alternately produce a first tracking control intermittent pilot signal of a first phase and a second tracking control intermittent pilot signal having a phase which alternates between said first phase and an inversion thereof, wherein the frequency band of each pilot signal is lower than that of the video signal and the frequency spectra of said first and second intermittent pilot signals is frequency interleaved with each other and shares almost the same frequency band;

means for recording said video signal mixed with said first pilot signal in a (2N−1)th track and mixed with said second pilot signal in a 2Nth track of said plurality of adjacent tracks where N is an integer, such as N=1, 2, 3, . . . ;

means responsive to said pilot signal alternating signal for resetting said gating means to arrange the recording positions of the pilot signals on the (2N−1)th and (2N+1)th tracks so that they do not align in a direction transverse to the tracks, and to arrange the recording positions of the pilot signal on the 2Nth and (2N+2)th tracks so that they do not align in a direction transverse to the tracks, respectively;

said system including a reproducing apparatus, comprising:

means for reproducing recorded signals from the recording medium;

filter means for deriving a signal mixture of pilot signal components of a main reproduced track and front and rear adjacent reproduced tracks from the reproduced signals;

non-inversion/inversion switching means responsive at least to a second alternating pilot signal, for switching between positions causing non-inversion and inversion of the derived pilot signal components to alternately reproduce the first and the second intermittent pilot signals;

first separation means for separating a pilot signal component of the main reproduced track and pilot signal components of the front and rear adjacent tracks, wherein said separation means comprises a delay means for delaying the pilot signal components from said switching means by a 2H period, where H designates one horizontal scanning period of the video signal, an adder and a subtractor for respectively adding to and subtracting from the pilot signal components from said switching means the delayed pilot signal components to separate out the main reproduced track pilot signal component and the adjacent tracks pilot signal components, respectively;

second and third separation means for substantially separating the pilot signal components of the front and rear adjacent tracks respectively from said adjacent tracks pilot signal components in response to said main reproduced track pilot signal component and the horizontal sync signal;

comparator means for comparing levels of the separated pilot signal components of the front adjacent track and the rear adjacent track; and means for controlling the position of said reproducing means relative to the tracks of said recording medium using a signal derived from the comparison of the levels of said front and rear adjacent track pilot signals.

11. A system according to claim 10, wherein said means for controlling controls at least one of the position of said reproducing means and the movement speed of aaid recording medium.

12. A signal tracking control system for use with an apparatus for sequentially recording and reproducing a video signal in a plurality of adjacent tracks on a recording medium, said system including on the recording side:

first means for generating for every 2H period, where H designates a horizontal scanning period of the video signal, a first burst-type pilot signal having a center frequency of substantially $nf_H$, where n designates a positive integer and $f_H$ a horizontal sync frequency of the video signal;

second means for generating for every 2H period a second burst-type pilot signal having as a center frequency one of $(n+\frac{1}{4})f_H$ and $(n-\frac{1}{4})f_H$, said second burst-type pilot signal having a phase which is inverted every 2H period;

third means for sequentially recording with the video signal the generated first pilot signals and the generated second pilot signals alternately and respectively on one and the other of (2k−1)th and (2k)th tracks of said adjacent tracks, where k designates an integer, e.g., k=1, 2, 3, ..., with the pilot signals of adjacent tracks being frequency interleaved to make the first and second burst-type pilot signals share a sideband region;

fourth means for controlling the generation of said first and second burst-type pilot signals to locate the recorded positions of the burst-type pilot signals on the (2k−1)th and (2k+1)th tracks, so that they do not align in a direction transverse to the tracks and to locate the recorded positions of pilot signals on 2kth and (2k+2)th tracks, so they do not align in a direction transverse to the tracks;

said system including on the reproducing side:

fifth means for reproducing a mixed signal composed of the recorded video signal and pilot signals of a main reproduced track, and front and rear adjacent reproduced tracks;

sixth means for extracting pilot signal components from the reproduced mixed signal;

seventh means for separating pilot signal components of the main reproduced track, and adjacent reproduced tracks respectively, said seventh means means comprising a two horizontal scan period delay line for delaying the derived pilot signal components by a 2H period, an adder for adding the derived signal components and the delayed signal components to separate the main reproduced track pilot signal component, and a subtractor for subtracting one from the other of said derived and said delayed signal components to separate the adjacent tracks pilot signal components;

eighth means for detecting a reproduction timing of the separated main reproduced track pilot signal component and substantially separating in time the front adjacent track pilot signal component and the rear adjacent track pilot signal component with reference to the detected reproduction timing;

ninth means for comparing levels of the separated front and rear adjacent track pilot signal components to produce a tracking error signal; and tenth means for controlling the position of said reproducing means relative to the tracks of said recording medium in response to said tracking error signal.

13. A system according to claim 12, wherein said means for controlling controls at least one of the position of said reproducing means and the movement speed of said recording medium.

* * * * *